June 27, 1939.  R. E. NEWELL  2,163,801
THERMOSTATIC CONTROL
Original Filed Dec. 7, 1935
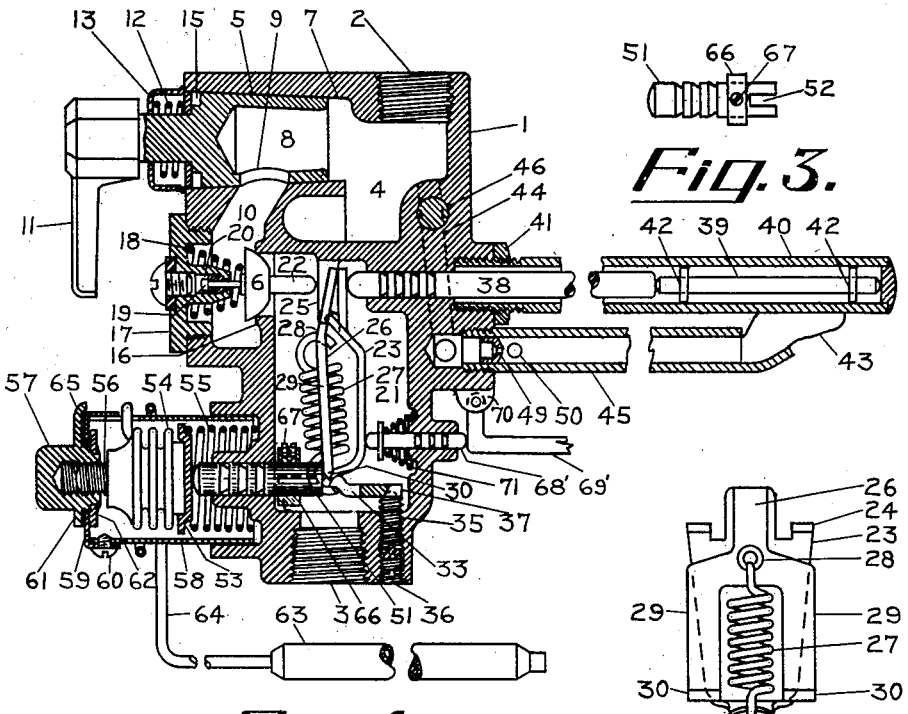
Fig.1.
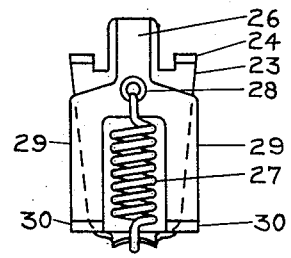
Fig.3.
Fig.4.
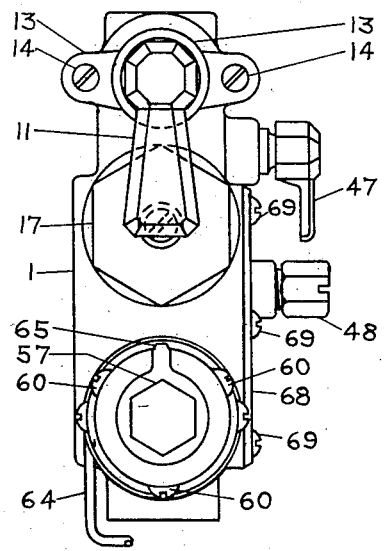
Fig.2.
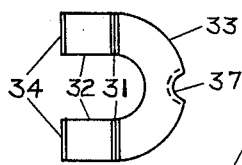
Fig.5.  Fig.6.
Fig.7.
Inventor
Robert E. Newell
Attorney Patented June 27, 1939

2,163,801

UNITED STATES PATENT OFFICE 2,163,801

THERMOSTATIC CONTROL

Robert E. Newell, Youngwood, Pa., assignor to Robertshaw Thermostat Company, Youngwood, Pa., a corporation of Pennsylvania Application December 7, 1935, Serial No. 53,359
Renewed May 6, 1939

10 Claims. (Cl. 236—48)

This invention relates to thermostatic controls in which a single control member is arranged to be operated in accordance with the demands of two thermostats and is particularly useful for controls in which the two thermostats are located in different heat zones with the control member being operated in accordance with temperature variations in one heat zone and independently operated upon the development of an abnormal temperature condition in the other heat zone.

For illustrative purposes the invention is shown as adapted for use with a gas heating burner and a pilot burner, although it may obviously be adapted for other uses. In this preferred adaptation, I provide a single valve operable in accordance with the presence or absence of a pilot flame and also operable, during the presence of the pilot flame, in response to the temperature of the medium to be controlled. The valve is so arranged that it will not be opened unless two conditions are fulfilled; first, the pilot must be burning, and second, the temperature of the medium must be lower than that desired. However, the valve will be shut off if either the pilot flame is extinguished or the medium reaches the desired temperature. In other words, as long as the pilot is burning, the valve will be freely and independently regulated by a first thermostat responsive to the temperature of the medium; but if the pilot is not burning, the valve will be moved to a closed position, regardless of the temperature of the medium, by a second thermostat which is located within the heat zone of the pilot burner.

It has been customary heretofore in installing thermostatic controls to use two automatically operated valves, one for temperature control and one for a safety pilot control. As the fuel passes through each valve, an undesirable drop in fuel pressure occurs. It is quite apparent that the provision of one valve to take the place of two is advantageous not only in reducing the pressure drop in the fuel supply line, but also in reducing the cost of the control. Installation of the control is thus simplified as it is only necessary to insert one automatic valve instead of two. Thus the cost of one valve structure and the expense of the installation thereof is eliminated.

The fact that the valve which is to be used as a safety control is in constant operation under the influence of the temperature control thermostat is also a distinct advantage of my invention. The usual safety pilot control heretofore employed consisted of an independent valve which was opened when the pilot was first ignited at the time of installation, and was designed to automatically close if the pilot flame was extinguished. However, every effort was put forth to provide a pilot burner whose flame would not go out and consequently the safety valve would often remain open for a rather lengthy period, after which the valve may have taken a set position and because of dirt, hardened grease, loss of spring tension or other reasons, would not close properly if the pilot flame went out. Such a condition rendered the safety control undependable. As previously mentioned, the valve of my device is constantly operated and kept in working condition by the temperature control thermostat and any defect would be immediately noticeable.

In the illustrated embodiment of my invention, I provide a thermostatically actuated snap acting mechanism operatively connected with the valve. Means other than a snap acting mechanism may be employed but it is believed to be more difficult to accomplish the desired result with a snap acting mechanism, and the value of a snap acting valve is well known to those acquainted with the thermostatic art. This mechanism is so constructed as to constantly tend, of itself, to open the valve, and the two thermostats engage the mechanism to oppose its normal tendency and allow the valve to be closed. By having the mechanism tending, of itself, to open the valve, it is possible to arrange the two thermostats so that the forces developed thereby will never oppose each other.

It is often desirable in thermal control systems to include an auxiliary control to regulate the operation of a fan, an air shutter, or some other device such as is commonly used to increase the efficiency of the system. For this purpose, I have provided an auxiliary control member which is actuated by the primary control or valve operating means. This auxiliary control member may in turn operate a switch, valve or other suitable means for regulating the operation of the particular device to be used.

In the structure shown, I have used for the temperature control, a bellows type thermostat having a capillary tube connecting the bellows with a sensitive bulb which is placed in the medium to be controlled, thus allowing considerable flexibility in installation. For the safety pilot thermostat, I have used a rod and tube thermostat of particular construction for rapid response to extinguishment of the pilot flame and to simplify installation, a pilot burner has been rigidly mounted on the control casing which insures the pilot flame being located in the proper position relative to the safety pilot thermostat. Incorporated in the same casing with the valve is a manually operable cock for controlling the flow of fuel to the pilot burner and an additional valve for adjusting the size of the flame. A dirt trap and a main line gas cock have also been included within the same casing. Thus the preferred device assembles all the necessarily manually operable controls into one compact structure with the automatic controls. Such a structure is advantageous to the user both from the standpoint of expense and of convenience. Of course it is not absolutely necessary to used such a combination with the automatically controlled valve, but the ease of installation and convenience of operation make such a device desirable. In this drawing:

Figure 1 is a vertical sectional view through a structure embodying the present invention;

Figure 2 is a side elevation view of the device;

Figure 3 is a plan view of the snap acting mechanism actuating pin shown in Figure 1;

Figure 4 is a view showing the assembled relation of the parts of the snap acting mechanism for operating the valve;

Figure 5 is an elevation view of the valve operating lever of the mechanism;

Figure 6 is an elevation view of the main lever of the mechanism; and

Figure 7 is a plan view of the bridge or lever supporting member.

As illustrated in this drawing, 1 indicates the valve casing having an inlet 2 and an outlet 3 from which the gas passes to a heating burner which is not shown. Adjoining the inlet is a chamber 4 which is so shaped as to form a dirt trap to collect any foreign matter in the gas which might otherwise be carried into the valve proper. A gas cock 5 of the conventional tapered plug type is positioned within the casing 1 to control the flow of gas from the chamber 4 to the automatically operated valve 6. The plug cock 5 fits in a tapered bore 7 and has an axial passage 8, communicating with chamber 4 and having a port 9 arranged to cooperate with a second passage 10 leading through the casing to valve 6. A handle 11 is mounted on the cock outside of the casing to permit manual rotation of the plug 5 to move port 9 into or out of alignment with the passage 10. A spring 12 is located between a cap 13, secured to the casing by screws 14, and a washer 15 mounted on the cock 5, and serves to hold the tapered plug in place.

The valve 6 cooperates with a valve seat 16 formed in the casing to control the flow of gas through the passage 10. Positioned on the casing adjacent valve 6 is a valve cap 17 which may be removed to allow cleaning of the valve and seat. A spring 18 between the cap and the valve constantly urges the valve toward its seat. The valve is arranged to be operated by a lever or snap acting mechanism to be hereinafter described and has a guide pin 19 which slides back and forth in the bore 20 in the cap 17.

A large chamber 21 within the casing 1 is connected with passage 10 by an opening in the upper end of the left wall of the chamber, said opening being concentric with the valve seat 16 so that the stem 22 of the valve extends into the chamber 21. Thus the gas flows through the inlet 2 to chamber 4, thence through cock 5, passage 10 and past valve 6 into chamber 21 and out the outlet 3 in the bottom of chamber 21.

Mounted substantially vertically in chamber 21 is the main lever 23 of the snap acting mechanism. Two small projections from lever 23 a short distance below the upper extremity thereof, are equipped with knife edges 24 which cooperate with V shaped grooves or bearings provided in portions 25 which extend downwardly from the upper wall of the chamber 21 on each side of the upper end of the lever 23. Thus, the main lever is pivoted intermediate the ends thereof which remain free to move.

A secondary or valve operating lever 26 is mounted in the chamber 21 substantially parallel to the main lever 23, with its upper end arranged to engage the stem 22 of the valve 6. The lower end of lever 26 is forked to receive a tension spring 27 whose upper end is hooked into the hole 28 in the lever 26 and whose lower end is hooked over the lower end of the main lever 23, thus interconnecting the two levers. The forked arms 29 of the lever 26 are also provided with knife edges 30 arranged to cooperate with bearings 31 carried by the arms 32 of a horseshoe shaped bridge member 33. The extremities of the arms 32 are also equipped with knife edges 34 which rest in bearings formed in the side wall of chamber 21. The horseshoe shaped bridge extends substantially horizontally across the bottom of the chamber with the knife edges in the bearings on the left and the curved portion on the right being supported by an adjusting screw 35 which protrudes through a threaded opening 36 in the casing to engage a recess 37 in the bridge. Movement of the screw 35 up and down raises or lowers the end of the bridge and thus changes the relative positions of the bearings of the two levers and effects an adjustment of the tension of the spring 27.

As described, the snap acting mechanism thus consists of a main lever pivoted on knife edges intermediate the ends thereof, a secondary lever pivoted at its lower end on a horseshoe shaped bridge, and a tension spring interconnecting the middle of the secondary lever and the lower end of the main lever which is free to move back and forth between the arms of the bridge. Both the main and secondary levers are thus held in their bearings by the tension spring. As the main lever is rotated clockwise about its pivot, the lower end of the tension spring is also rotated about the point of its connection to the secondary lever. As soon as the line of force of this spring passes to the left of the plane of the point of connection 28 of the tension spring and the points of bearing 30 of the secondary lever, said lever will be snapped to the left about its bearings and the upper end of the lever will strike the valve stem and open the valve. Similarly, counter-clockwise movement of the main lever will cause the secondary lever to be snapped to the right and allow the valve to be closed.

It is necessary for the proper operation of this particular structure that the levers be so shaped that the point 28 at which the tension spring 27 is hooked to the secondary lever is always on the left of a line between the knife edged pivots 24 and 30. Then when the upper end of the secondary lever 26 is snapped to the right as a result of rotation of the main lever by one of the thermostats, the tension spring still tends to pull the lower end of lever 23 and the upper end of lever 26 together. The lever 26 cannot be moved any further to the right, the direction of the line of force of the spring on that lever, but as soon as the forces of both thermostats are removed from the lever 23, the spring 27, since the point 28 is to the left of line 24—30, will pull the lower end of 23 to the left about pivots 24 until the line of force of the spring passes to the left of the plane of points 28 and 30 and snaps lever 26 to the left. In other words, in the absence of any outside influences or actuating means, the lever 26 will normally be held in its left position to in turn hold the valve 6 open, and, in order to then snap lever 26 to the right and allow the valve 6 to be shut, a force must be exerted on the main lever 23 to move its lower end to the right. When this force is removed the lever 26 will be snapped to the left as above described.

One side of the casing 1 is left open to allow installation of the snap acting mechanism and is thereafter sealed by a gas tight cover 68 held on by screws 69. An opening in the casing at the upper end of chamber 21 on the opposite side of the levers from the valve permits the extension therethrough of a substantially horizontal rod 38 which engages the upper end of the main lever 23 above its pivot points. A series of glands on the rod 38 prevent the leakage of gas around the rod which extends outwardly from the casing 1 for any desired distance. The outer extremity of rod 38 abuts against one end of a smaller rod 39, the other end of which bears against the plugged end of a tube 40 which encases the rod 39 and the portion of the rod 38 which extends without the casing 1. The tube 40 is screwed into casing 1 and held in place by nut 41. The small rod 39 is made of a relatively non-expansible material and is held in a central position by guides 42, while both the tube 40 and the rod 38 are formed of materials having substantially the same relatively high coefficient of expansion, thus forming a so-called "rod and tube" thermostat.

A pilot flame 43 for the ignition of the heating burner is so located that it plays on the portion of the tube 40 containing the rod 39. Gas is supplied for this flame directly from the chamber 4 through passage 44 in the casing 1 and pipe 45 which is mounted on the casing directly below the tube 40. A small plug type gas cock 46 having a handle 47 on the exterior of the casing, is inserted in passage 42, whereby the gas to the pilot flame may be manually shut off or turned on, as the case may be. Another small but quite accurately adjustable valve 48 is located at the entrance to pipe 45 and is arranged to permit regulation of the quantity of gas to be passed to the pilot flame. An orifice 49 is mounted within the pipe 45 just ahead of an opening 50 therein to cause the gas to be mixed with the proper amount of air for combustion.

The lengths of the tube 40 and rods 38 and 39 are so designed that when the pilot is not burning, the rod 38 will be far enough to the left to have rotated the main lever 23 sufficiently to have snapped lever 26 to the right and allowed valve 6 to be closed. Thus as long as the pilot is not burning, the rod 38 will bear against the main lever to prevent the valve from being opened. When the pilot flame is ignited and plays on the outer portion of the tube, that portion of the tube becomes hot and expands rather quickly. As the rod 39 within the portion of the tube exposed to the flame is non-expansible, the difference in the expanded length of the tube and the combined lengths of the rods 38 and 39 will allow the main lever to be rotated clockwise and the secondary lever snapped to the left to open the valve, assuming that no other force is applied to the mechanism. If the pilot flame is extinguished the rod and tube thermostat will cool and the valve will again be closed.

The provision of the non-expansible rod 39 in the portion of the tube 40, which is directly subjected to the flame of the pilot burner, and the rod 38 having substantially the same coefficient of expansion as the tube, within the other portion thereof, is not absolutely essential to the operation of the structure, but is quite advantageous. When the pilot flame is first lighted, the portion of the tube encasing the non-expansible rod will heat and expand rapidly to allow the valve to be opened. As the pilot continues to burn, the heat will be conducted along the tube to the portion containing the expansible rod, whereupon both this portion and the rod will expand equally and the valve will not be affected. Now, if the pilot flame is subsequently extinguished, the portion of the tube that had been subjected to the flame will cool quite rapidly and the other portion having a greater and more exposed surface will cool quicker than the expanded rod within. Thus, the contraction of the tube will take place while the rod 38 is still in an expanded condition and the valve will be closed in a very short time after the pilot is extinguished. If a single non-expansible rod were used in place of the rods 38 and 39, the opening period would only be slightly decreased while the closing period would be considerably increased.

Thus I have provided an actuating means which does not affect the snap mechanism or the valve as long as the pilot is burning, but which will cause the valve to be closed if the pilot is extinguished and will lock the snap mechanism to prevent reopening of the valve until the pilot is re-ignited.

Extending through an opening in the casing wall near the bottom of chamber 21 and substantially parallel to but on the opposite side of the levers from the rod 38, is a gland pin 51. The right end of the pin 51 passes between the arms of the bridge 32 and abuts against the lower end of the main lever 23, the pin having a vertical slot 52 through which passes the end of the tension spring which also engages the lower end of the main lever. The other extremity of pin 51 bears against a plate 53 which covers the free end of a flexible bellows 54, and also serves as a mounting for a load spring 55 situated between the plate and the casing 1. The other end of the bellows 54 consists of a threaded projection 56 which cooperates with a threaded bore in an operating knob 57. A tubular sleeve 58 surrounds the bellows, plate and load spring and acts as a casing therefor, having one end abutting against the casing 1 and the other end covered by a cap 59 which is secured thereto by screws 60. A central opening is provided in cap 59 through which a part of the knob 57 extends. Knob 57 is provided with a circular shoulder 61 slightly larger than the opening in the cap. This shoulder rests against or very nearly against the cap 59 and a washer 62 is riveted to the knob on the other side of the cap in such a manner that the load spring 55, acting on the knob through the bellows, holds the washer constantly against the cap, whereby longitudinal movement of the knob is prevented.

The bellows 54 is connected to a bulb 63 by a flexible capillary tube 64 which passes through a slot in sleeve 58. The bellows, bulb and capillary tube are filled with a suitable thermally responsive fluid. The bulb has a greater capacity than the tube and bellows and should be placed in the medium to be controlled. Then as the temperature of the medium is raised by the heat of the main burner, the thermally responsive fluid will be expanded, which in turn will cause the bellows to be expanded. When the bellows expands, the gland pin 51 is moved to the right to actuate the main lever 23 to snap the mechanism and close the valve, shutting off the supply of fuel to the main burner. As the medium subsequently begins to cool, the bellows contracts to remove the force of the pin 51 from lever 23, whereupon the valve will be snapped open to again pass fuel to the burner to maintain the medium at a uniform temperature.

A collar 66 is carried on pin 51 and is held stationary by the set screw 67. This collar is arranged to abut against the wall of the chamber 21 to limit the movement of the pin 51 to the left, which will also limit the clockwise movement of the main lever 23 about its pivot. As mentioned hereinbefore, the tension spring 27 is constantly tending to rotate the main lever 23 in clockwise direction and contraction of the bellows 54 will allow such movement to take place, providing, of course, that the pilot is burning. The purpose of the limiting means is to stop the movement of said main lever in the clockwise direction shortly after the valve has been opened as a result of such movement. The force exerted on the main lever by the tension spring is then absorbed by the limiting means. Otherwise, this force would be transmitted through the lever to the rod and tube thermostat, which, being in a heated condition, is liable to slight distortion under continual pressure. The collar 66 is searate from the pin and should be adjusted along the pin 51 to the proper position and the set screw 67 then tightened to hold the collar in place.

The provision of the above described movement limiting means is exceedingly important in a structure of this type because without such means the thermostat is liable to become distorted and the device consequently rendered inoperative. The limiting means does not interfere with the operation of the device but does prevent a pressure load from being placed on the hot thermostat.

Since longitudinal movement of the knob is prevented, rotation thereof will act through the threaded connection with the bellows to change the bellows position which will vary the amount of expansion necessary to operate the snap acting mechanism. Thus the temperature at which the medium will be maintained may be adjusted by rotating the knob 57. A pointer 65, carried by the knob 57, is arranged to cooperate with appropriate indicia inscribed on the cap 59.

Bearing against the lower end of the main lever 23 on the opposite side thereof from the pin 51, is another smaller gland pin 68' which extends therefrom through the wall of chamber 21 to engage an auxiliary control member lever 69'. The lever 69 has one end pivoted on an ear 70 which protrudes from the casing 1, while the other end may be used for operating a device such as a switch or valve for regulating a suitable auxiliary device such as a fan or an air shutter as previously mentioned. A very light spring 71 is positioned between the wall of chamber 21 and a shoulder carried by the pin 68 and serves to keep the pin 68 in constant engagement with the main lever 23 so that the pin 68 will be moved as the main lever is moved.

The general operation of the structure hereinbefore described is as follows: The pointer 65 is set to the temperature at which it is desired to maintain the medium in which the bulb is located. The main gas cock 5 is then turned on but since the valve 6 is not yet open, no gas will be supplied to the heating burner. Then the pilot gas cock 45 is opened, the pilot ignited and the size of the flame 43 adjusted by the valve 47. Flame 43 heats the rod and tube thermostat and the influence of the rod 38 is withdrawn from the snap acting mechanism. When this is done and if the temperature of the medium is below that desired, the valve 6 will be snapped open to supply fuel to the heating burner. When the temperature of the medium reaches that desired, the pin 51 will be moved to the right and the valve 6 closed. Thereafter, the medium will begin to cool which will result in the valve being reopened and the cycle repeated. However, if at any time the pilot flame is extinguished, the rod 38 will bear against the main lever of the snap acting mechanism to cause the valve to be closed and held in that position until the pilot is re-ignited.

Throughout the above operation the pin 68 follows the movement of the main lever of the mechanism to actuate the auxiliary control lever 69. Thus as the valve is opened the lever 69 is moved to one position and as the valve is closed the lever 69 is moved to the opposite position.

As mentioned before, it is important that the snap acting mechanism be arranged to constantly tend, of itself, to open the valve. The thermostats then serve to actuate the mechanism to effect the closure and to allow the opening of the valve. Such an arrangement makes it possible for either thermostat to actuate the mechanism to close the valve independently of the other and since the thermostats have a pressure bearing engagement with the mechanism, the forces developed thereby will never oppose each other.

Although I have illustrated and described a preferred form of my invention, it is not necessarily limited thereto, as it may be otherwise embodied within the scope of the appended claims.

I claim:

1. A thermostatic control device comprising a valve, a lever mechanism for operating said valve including a snap acting lever engageable therewith, a thermostat arranged to actuate said mechanism to snap said lever and effect snap opening and closing of said valve, and a second thermostat positioned to actuate said mechanism to snap said lever and effect snap closing of said valve independently of said first thermostat.

2. In a thermostatic control for use with a heating burner and a pilot burner, a valve for controlling the flow of fuel to said heating burner, a lever mechanism for operating said valve including a spring operated, snap acting lever engageable therewith, a thermostat responsive to temperatures caused by said heating burner and operable to actuate said mechanism and snap said lever to operate the valve in accordance with temperature variations, and a second thermostat responsive to pilot temperatures and operable to actuate said mechanism and snap said lever to snap the valve closed independently of said first thermostat upon extinguishment of the flame at said pilot burner.

3. A thermostatic control device comprising a control member movable in two opposite directions, a lever mechanism including a spring operated, snap acting lever operatively engageable with said member, said spring being arranged to constantly tend, of itself, to snap said lever and move said member in one direction, a thermostat positioned to engage said mechanism to oppose said spring tendency in accordance with temperature variations and effect a reciprocating snap movement of said member, and a second thermostat positioned to actuate said mechanism in opposition to said spring tendency and effect snap movement of said member in the second direction independently of said first thermostat.

4. In a thermostatic control device, a control member movable in two opposite directions, a lever mechanism including a spring operated, snap acting lever operatively engageable with said member, said spring being arranged to constantly tend, of itself, to snap said lever and move said member in one direction, and a plurality of thermostats positioned to independently actuate said mechanism in opposition to said spring tendency to effect snap movement of said member in the second direction, said thermostats having a pressure bearing engagement with said mechanism, whereby the forces exerted upon the mechanism by the thermostats will never oppose each other.

5. In a thermostatic control device, a control member movable in two opposite directions, a lever mechanism including a spring operated, snap acting lever operatively engageable with said member, said spring being arranged to constantly tend, of itself, to snap said lever and move said member in one direction, a thermostat located in a first heat zone and arranged to engage said mechanism to oppose said spring tendency in accordance with temperature variations to effect a reciprocating snap movement of said member, and a second thermostat located in a second heat zone and arranged to actuate said mechanism in opposition to said spring tendency to effect snap movement of said member in the second direction independently of said first thermostat upon the development of an abnormal temperature therein, said second thermostat being normally disengaged from said mechanism to permit free movement thereof by said first thermostat.

6. In a thermostatic control for use with a heating burner and a pilot burner, a valve for controlling the flow of fuel to said heating burner, a lever mechanism including a spring operated, snap acting lever adapted to directly engage and operate said valve, said spring being arranged to constantly tend, of itself, to snap said lever to open said valve, a thermostat responsive to temperatures affected by said heating burner for engaging said mechanism to oppose said spring tendency and effect snap closing and opening of said valve in accordance with temperature variations, and a second thermostat responsive to pilot temperatures for actuating said mechanism in opposition to said spring tendency to cause snap closing of said valve independently of said first thermostat upon extinguishment of the flame at said pilot burner.

7. In a control device for use with a heating burner and a pilot burner, a casing, a valve therein for controlling the flow of fuel to said heating burner, a secondary or valve operating lever mounted in said casing, a main lever in said casing, a spring interconnecting said levers to impart snap movement to said secondary lever to open and close said valve when the main lever is moved gradually in opposite directions, said spring being arranged to constantly tend, of itself, to move said main lever in a direction to cause snap opening of said valve, a thermostat responsive to temperatures affected by said heating burner for actuating said main lever in opposition to said spring tendency and control snap opening and closing of said valve in accordance with temperature variations, and a second thermostat responsive to pilot temperatures for actuating said main lever in opposition to said spring tendency to cause snap closing of said valve independently of said first thermostat upon extinguishment of the flame at said pilot burner.

8. A device as set forth in claim 7 in which the thermostats have a pressure bearing engagement with said main lever, and said second thermostat remains disengaged from said main lever as long as there is a flame at said pilot burner, whereby the forces developed by the two thermostats will never oppose each other.

9. A thermostatic control device comprising control means, a lever mechanism including a lever movable in two opposite directions for operating said control means, said mechanism being arranged when actuated to operate said lever with a snap action, a thermostat arranged to actuate said mechanism and snap said lever back and forth, and a second thermostat arranged to actuate said mechanism and snap said lever in one direction independently of said first thermostat.

10. A thermostatic control device comprising a casing, a control member therein, a secondary or control operating lever pivotally mounted in said casing, a main lever pivotally mounted intermediate its ends within said casing, a spring inter-connecting said levers, the levers and spring being so arranged that gradual movement of said main lever will impart a snap movement to the secondary lever, said spring being positioned to constantly tend to move said main lever in a first direction about its pivot, and a pair of thermostats positioned to independently engage opposite ends of the main lever to move same in a second and opposite direction about its pivot, said thermostats having pressure bearing engagements with the main lever, whereby said main lever may be moved in said second direction by either thermostat but it may be moved in the first direction only when both thermostats concur in permitting such movement.

ROBERT E. NEWELL.

CERTIFICATE OF CORRECTION.

Patent No. 2,163,801. June 27, 1939.

ROBERT E. NEWELL.

It is hereby certified that error appears in the printed specification of the above numbered patent requiring correction as follows: Page 4, first column, line 33-34, for "searate" read separate; same page and column, line 62, and second column, lines 24, 25, and 27, for the reference numeral "69" read 69'; same page 4, first column, lines 69, 70, and 71, and second column, line 22, for the reference numeral "68" read 68'; and that the said Letters Patent should be read with this correction therein that the same may conform to the record of the case in the Patent Office.

Signed and sealed this 8th day of August, A. D. 1939.

(Seal)

Leslie Frazer,
Acting Commissioner of Patents.